(12) United States Patent
Kang et al.

(10) Patent No.: US 7,480,338 B2
(45) Date of Patent: Jan. 20, 2009

(54) CONSTELLATION MAPPING APPARATUS AND METHOD

(75) Inventors: Hun-sik Kang, Daejeon (KR); Jong-won Kim, Dajeon (KR)

(73) Assignee: Electronics and Telecommunications Research Institute (KR)

( * ) Notice: Subject to any disclaimer, the term of this patent is extended or adjusted under 35 U.S.C. 154(b) by 788 days.

(21) Appl. No.: 11/133,645

(22) Filed: May 20, 2005

(65) Prior Publication Data

US 2005/0220205 A1   Oct. 6, 2005

Related U.S. Application Data

(62) Division of application No. 10/682,447, filed on Oct. 8, 2003, now Pat. No. 6,917,559.

(30) Foreign Application Priority Data

Oct. 10, 2002   (KR)   ............................... 2002-61788

(51) Int. Cl.
*H04L 5/12* (2006.01)
(52) U.S. Cl. ...................................... 375/261
(58) Field of Classification Search ................ 375/222, 375/223, 261, 264, 271, 279, 298, 302, 308; 332/103
See application file for complete search history.

(56) References Cited

U.S. PATENT DOCUMENTS

| 4,646,326 | A | | 2/1987 | Backof, Jr. et al. |
| 5,428,643 | A | | 6/1995 | Razzell |
| 5,812,594 | A | * | 9/1998 | Rakib ........................ 375/219 |
| 6,115,415 | A | | 9/2000 | Goldstein et al. |
| 6,134,273 | A | | 10/2000 | Wu et al. |
| 6,138,265 | A | * | 10/2000 | Morelos-Zaragoza et al. ........................ 714/792 |
| 6,654,431 | B1 | * | 11/2003 | Barton et al. ............... 375/346 |
| 2004/0109376 | A1 | | 6/2004 | Lin ........................ 365/230.03 |

* cited by examiner

*Primary Examiner*—Don N Vo
(74) *Attorney, Agent, or Firm*—Blakely, Sokoloff, Taylor & Zafman

(57) ABSTRACT

A constellation mapping apparatus, which can reduce the storage capacity of a memory to one fourth by only storing constellation points in one quadrant of each constellation map rather than storing all the constellation points in each of the constellation maps, is provided. The constellation mapping apparatus includes a memory, an address generation block, a complementation logic block, and a scaling block. In the memory, constellation values in one of four quadrants of each constellation. The address generation block receives constellation point data, bits-per-symbol information, and valid symbol information indicating whether or not the bits-per-symbol information is valid, and generates address information of the memory where the constellation values corresponding to the constellation point data are stored and quadrant information indicating a quadrant where the constellation point data are placed. Based on the quadrant information for the constellation point data, the complementation logic block complements or does not complement the constellation values read from the memory following the address information. The scaling block outputs an output of the complementation logic block or a value obtained by multiplying the output of the complementation logic block by a predetermined gain obtained based on a baud rate, which indicates a speed of transmitting the bits-per-symbol information.

6 Claims, 16 Drawing Sheets

FIG. 4C

|       |       |       |       |
|-------|-------|-------|-------|
| 7 •   | 6 •   | • 2   | • 3   |
| 0111  | 0110  | 0010  | 0011  |
| 5 •   | 4 •   | • 0   | • 1   |
| 0101  | 0100  | 0000  | 0001  |
| 13 •  | 12 •  | • 8   | • 9   |
| 1101  | 1100  | 1000  | 1001  |
| 15 •  | 14 •  | • 10  | • 11  |
| 1111  | 1110  | 1010  | 1011  |

FIG. 4D

|        | 10 ●   | 14 ●   | ● 6    | ● 2    |        |
|--------|--------|--------|--------|--------|--------|
|        | 01010  | 01110  | 00110  | 00010  |        |
| 16 ●   | 13 ●   | 12 ●   | ● 4    | ● 5    | ● 7    |
| 01111  | 01101  | 01100  | 00100  | 00101  | 00111  |
| 11 ●   | 9 ●    | 8 ●    | ● 0    | ● 1    | ● 3    |
| 01011  | 01001  | 01000  | 00000  | 00001  | 00011  |
| 27 ●   | 25 ●   | 24 ●   | ● 16   | ● 17   | ● 19   |
| 11011  | 11001  | 11000  | 10000  | 10001  | 10011  |
| 31 ●   | 29 ●   | 28 ●   | ● 20   | ● 21   | ● 23   |
| 11111  | 11101  | 11100  | 10100  | 10101  | 10111  |
|        | 26 ●   | 30 ●   | ● 22   | ● 18   |        |
|        | 11010  | 11110  | 10110  | 10010  |        |

FIG. 4E

| | | | | | | | | |
|---|---|---|---|---|---|---|---|---|
| 26 ● | 27 ● | 25 ● | 24 ● | | ● 8 | ● 9 | ● 11 | ● 10 |
| 011010 | 011011 | 011001 | 011000 | | 001000 | 001001 | 001011 | 001010 |
| 30 ● | 31 ● | 29 ● | 28 ● | | ● 12 | ● 13 | ● 15 | ● 14 |
| 011110 | 011111 | 011101 | 011100 | | 001100 | 001101 | 001111 | 001110 |
| 22 ● | 23 ● | 21 ● | 20 ● | | ● 4 | ● 5 | ● 7 | ● 6 |
| 010110 | 010111 | 010101 | 010100 | | 000100 | 000101 | 000111 | 000110 |
| 18 ● | 19 ● | 17 ● | 16 ● | | ● 0 | ● 1 | ● 3 | ● 2 |
| 010010 | 010011 | 010001 | 010000 | | 000000 | 000001 | 000011 | 000010 |
| 50 ● | 51 ● | 49 ● | 48 ● | | ● 32 | ● 33 | ● 35 | ● 34 |
| 110010 | 110011 | 110001 | 110000 | | 100000 | 100001 | 100011 | 100010 |
| 54 ● | 55 ● | 53 ● | 52 ● | | ● 36 | ● 37 | ● 39 | ● 38 |
| 110110 | 110111 | 110101 | 110100 | | 100100 | 100101 | 100111 | 100110 |
| 62 ● | 63 ● | 61 ● | 60 ● | | ● 44 | ● 45 | ● 47 | ● 46 |
| 111110 | 111111 | 111101 | 111100 | | 101100 | 101101 | 101111 | 101110 |
| 58 ● | 59 ● | 57 ● | 56 ● | | ● 40 | ● 41 | ● 43 | ● 42 |
| 111010 | 111011 | 111001 | 111000 | | 101000 | 101001 | 101011 | 101010 |

FIG. 4F

| | | | | | | | | | | | | |
|---|---|---|---|---|---|---|---|---|---|---|---|---|
| | | 44● | 45● | 61● | 60● | ●28 | ●29 | ●13 | ●12 | | |
| | | 0101100 | 0101101 | 0111101 | 0111100 | 0011100 | 0011101 | 0001101 | 0001100 | | |
| | | 36● | 37● | 53● | 52● | ●20 | ●21 | ●5 | ●4 | | |
| | | 0100100 | 0100101 | 0110101 | 0110100 | 0010100 | 0010101 | 0000101 | 0000100 | | |
| 55● | 54● | 50● | 51● | 49● | 48● | ●16 | ●17 | ●19 | ●18 | ●22 | ●23 |
| 0110111 | 0110110 | 0110010 | 0110011 | 0110001 | 0110000 | 0010000 | 0010001 | 0010011 | 0010010 | 0010110 | 0010111 |
| 63● | 62● | 58● | 59● | 57● | 56● | ●24 | ●25 | ●27 | ●26 | ●30 | ●31 |
| 0111111 | 0111110 | 0111010 | 0111011 | 0111001 | 0111000 | 0011000 | 0011001 | 0011011 | 0011010 | 0011110 | 0011111 |
| 47● | 46● | 42● | 43● | 41● | 40● | ●8 | ●9 | ●11 | ●10 | ●14 | ●15 |
| 0101111 | 0101110 | 0101010 | 0101011 | 0101001 | 0101000 | 0001000 | 0001001 | 0001011 | 0001010 | 0001110 | 0001111 |
| 39● | 38● | 34● | 35● | 33● | 32● | ●0 | ●1 | ●3 | ●2 | ●6 | ●7 |
| 0100111 | 0100110 | 0100010 | 0100011 | 0100001 | 0100000 | 0000000 | 0000001 | 0000011 | 0000010 | 0000110 | 0000111 |
| 103● | 102● | 98● | 99● | 97● | 96● | ●64 | ●65 | ●67 | ●66 | ●70 | ●71 |
| 1100111 | 1100110 | 1100010 | 1100011 | 1100001 | 1100000 | 1000000 | 1000001 | 1000011 | 1000010 | 1000110 | 1000111 |
| 111● | 110● | 106● | 107● | 105● | 104● | ●72 | ●73 | ●75 | ●74 | ●78 | ●79 |
| 1101111 | 1101110 | 1101010 | 1101011 | 1101001 | 1101000 | 1001000 | 1001001 | 1001011 | 1001010 | 1001110 | 1001111 |
| 127● | 126● | 122● | 123● | 121● | 120● | ●88 | ●89 | ●91 | ●90 | ●94 | ●95 |
| 1111111 | 1111110 | 1111010 | 1111011 | 1111001 | 1111000 | 1011000 | 1011001 | 1011011 | 1011010 | 1011110 | 1011111 |
| 119● | 118● | 114● | 115● | 113● | 112● | ●80 | ●81 | ●83 | ●82 | ●86 | ●87 |
| 1110111 | 1110110 | 1110010 | 1110011 | 1110001 | 1110000 | 1010000 | 1010001 | 1010011 | 1010010 | 1010110 | 1010111 |
| | | 100● | 101● | 117● | 116● | ●84 | ●85 | ●69 | ●68 | | |
| | | 1100100 | 1100101 | 1110101 | 1110100 | 1010100 | 1010101 | 1000101 | 1000100 | | |
| | | 108● | 109● | 125● | 124● | ●92 | ●93 | ●77 | ●76 | | |
| | | 1101100 | 1101101 | 1111101 | 1111100 | 1011100 | 1011101 | 1001101 | 1001100 | | |

| Bits-per-Symbol | VALID INPUT DATA BITS 7th -> 0th bit (X: not valid) |
|---|---|
| "000" | "XXXXXXXX" |
| "001" | "XXXXXX00" |
| "010" | "XXXXX000" |
| "011" | "XXXX0000" |
| "100" | "XXX00000" |
| "101" | "XX000000" |
| "110" | "X0000000" |
| "111" | "00000000" |

FIG. 8

| address | ROM Data |
|---|---|
| 0 | zero symbol |
| 1 | qpsk r(0) |
| 2 | 8-psk r(0) |
| 3 | 8-psk r(1) |
| 4 | 16-qam r(0) |
| 5 | 16-qam r(1) |
| 6 | 16-qam r(2) |
| 7 | 16-qam r(3) |
| ⋮ | ⋮ |
| 65 | 256-qam r(0) |
| 66 | 256-qam r(1) |
| 67 | 256-qam r(2) |
| ⋮ | ⋮ |
| 127 | 256-qam r(63) |

| address | ROM Data |
|---|---|
| 0 | zero symbol |
| 1 | qpsk I(0) |
| 2 | 8-psk I(0) |
| 3 | 8-psk I(1) |
| 4 | 16-qam I(0) |
| 5 | 16-qam I(1) |
| 6 | 16-qam I(2) |
| 7 | 16-qam I(3) |
| ⋮ | ⋮ |
| 65 | 256-qam I(0) |
| 66 | 256-qam I(1) |
| 67 | 256-qam I(2) |
| ⋮ | ⋮ |
| 127 | 256-qam I(63) |

FIG. 9

| Bits-per-Symbol | VALID INPUT DATA BITS 7th -> 0th bit (X: not valid) | Shfnum | INPUT DATA SHIFTED BY AS MUCH AS 7-Shfnum (X: not valid) |
|---|---|---|---|
| "000" | "XXXXXXXX" | 0 | "00000000" |
| "001" | "XXXXXXQQ" | 1 | "QQ000000" |
| "010" | "XXXXXQQB" | 2 | "QQB00000" |
| "011" | "XXXXQQBB" | 3 | "QQBB0000" |
| "100" | "XXXQQBBB" | 4 | "QQBBB000" |
| "101" | "XXQQBBBB" | 5 | "QQBBBB00" |
| "110" | "XQQBBBBB" | 6 | "QQBBBBB0" |
| "111" | "QQBBBBBB" | 7 | "QQBBBBBB" |

| QUARDANT | qi1 | qr0 | S1 | S0 |
|---|---|---|---|---|
| I | 0 | 0 | + | + |
| II | 0 | 1 | − | + |
| III | 1 | 1 | − | − |
| IV | 1 | 0 | + | − |

| QUARDANT | qi1 | qr0 | S1 | S0 |
|---|---|---|---|---|
| I | 0 | 0 | + | − |
| II | 0 | 1 | + | + |
| III | 1 | 1 | − | + |
| IV | 1 | 0 | − | − |

| QUARDANT | qi1 | qr0 | S1 | S0 |
|---|---|---|---|---|
| I | 0 | 0 | − | − |
| II | 0 | 1 | − | + |
| III | 1 | 1 | + | + |
| IV | 1 | 0 | + | − |

| QUARDANT | qi1 | qr0 | S1 | S0 |
|---|---|---|---|---|
| I | 0 | 0 | − | + |
| II | 0 | 1 | − | − |
| III | 1 | 1 | + | − |
| IV | 1 | 0 | + | + |

CONSTELLATION MAPPING APPARATUS AND METHOD

The present application is a Divisional of application Ser. No. 10/682,447, filed Oct. 8, 2003 now U.S. Pat. No. 6,917,559.

BACKGROUND OF THE INVENTION

This application claims the priority of Korean Patent Application No. 2002-61788, filed Oct. 10, 2002, in the Korean Intellectual Property Office, the disclosure of which is incorporated herein in its entirety by reference.

1. Field of the Invention

The present invention relates to a constellation mapping apparatus, which has a simpler structure by using a small-sized memory and a simple decoding circuit and is capable of processing a plurality of constellations, and more particularly, to a constellation mapping apparatus, which can be used in a quadrature amplitude modulator for data communications and can be applied to high-speed data communications using home telephone lines.

2. Description of the Related Art

As the Internet has come into wide use, research has been vigorously carried out on high-speed data communications using home telephone lines. In order to realize a high data transmission speed, a quadrature amplitude modulation (QAM) method has been widely adopted. In a communication manner adopting the QAM method, such as an asymmetric digital subscriber line (ADSL) or home phone line network alliance (home PNA), data are transmitted at different speeds depending on the channel state of a telephone line.

In order to vary a data transmission speed depending on the channel state of a telephone line, a quadrature amplitude modulator, capable of processing a plurality of constellation maps, is necessary. A quadrature amplitude modulator transmits a considerable amount of bit information per symbol via a telephone line when the channel state of the telephone line is good. On the other hand, when the channel state of the telephone line is not good, the quadrature amplitude modulator transmits a small amount of bit information per symbol via the telephone line. In other words, the quadrature amplitude modulator is capable of transmitting data at both high and low speeds through constellation mapping, depending on the channel state of a telephone line.

In home PNA, for example, 2-8 bit data per symbol are transmitted through 7 different constellations, i.e., a quadrature-phase shift keying (QPSK) constellation, an 8-QAM constellation, a 16-QAM constellation, a 32-QAM constellation, a 64-QAM constellation, a 128-QAM constellation, and a 256-QAM constellation. In such home PNA using a plurality of constellations, a memory having a very large storage capacity is necessary to bit-map constellations having different sizes. In addition, a circuit, which is capable of controlling or interpreting input data so that the input data can be mapped in an appropriate constellation corresponding to a desired data transmission speed, is also necessary.

FIG. 1 is a block diagram of a conventional constellation mapping apparatus. Referring to FIG. 1, a conventional constellation mapping apparatus includes a serial to parallel converter 110, an address computation block 120, and a ROM 130 where a look-up table is stored.

The serial to parallel converter 110 converts serial data input thereinto into parallel data and transmits the parallel data to the address computation block 120.

The address computation block 120 generates constellation addresses using bits-per-symbol information and data input thereinto and outputs the constellation addresses in the manner of a look-up table.

Specifically, the address computation block 120 selects a constellation among a plurality of constellations, i.e., an n-QAM constellation (here n is 4, 8, 16, 32, . . . , $2^{number\ of\ input\ bits}$) based on bits-per-symbol information. For example, in the case of processing constellations ranging from a 4-QAM constellation to a 256-QAM constellation, the bits-per-symbol information can be represented by 3 bits, since there are 7 constellations between a 4-QAM constellation and a 256-QAM constellation. Therefore, when the bits-per-symbol information has a value of 001, the address computation block 120 selects a 4-QAM constellation. When the bits-per-symbol information is 111, the address computation block 120 selects a 256-QAM constellation.

The ROM 130 stores a look-up table where the constellation addresses generated by the address computation block 120 are stored.

FIG. 2 is a diagram illustrating a 4-QAM constellation and a 16-QAM constellation. Referring to FIG. 2, in the case of a constellation mapping apparatus, which processes 4 QAM and 16 QAM, bits-per-symbol information can be represented by 1 bit. Accordingly, when the value of the bits-per-symbol information is '0', it represents 4 QAM, and when the value of the bits-per-symbol information is '1', it represents QAM. Input data converted into parallel data may be represented by 4 bits. In the case of a 4-QAM constellation, there exist 4 constellation points while in the case of a 16-QAM constellation, there exist 16 constellation points. Accordingly, a ROM, which stores such constellation points, stores 20 words for representing 20 constellation points for in-phase components and quadrature-phase components.

FIG. 3 is a diagram illustrating the structure of a memory for performing constellation mapping. Referring to FIG. 3, an address computation block generates 4 QAM addresses using parallel input data when bits-per-symbol information is '0'. On the other hand, when the bits-per-symbol information is '1', the address computation block generates 16 QAM addresses using the parallel input data. Accordingly, if 1 word is represented by 8 bits in the case of processing constellations ranging from a 4-QAM constellation to a 256-QAM constellation, a ROM having a very large storage capacity, for example, a storage capacity of about 1 Kbyte (512 bytes×2), is necessary.

SUMMARY OF THE INVENTION

The present invention provides a constellation mapping apparatus, which can reduce the storage capacity of a memory to one fourth by only storing constellation points in one quadrant of each constellation map rather than storing all the constellation points in each of the constellation maps.

According to an aspect of the present invention, there is provided a constellation mapping apparatus. The constellation mapping apparatus includes a memory, in which constellation values in one of four quadrants of each constellation are stored, an address generation block which receives constellation point data, bits-per-symbol information, and valid symbol information indicating whether or not the bits-per-symbol information is valid, and generates address information of the memory where the constellation values corresponding to the constellation point data are stored and quadrant information indicating a quadrant where the constellation point data are placed, a complementation logic block which complements, based on the quadrant information for the constellation point data, or does not complement the constellation values read from the memory following the address information, and a scaling block which outputs an output of the complementation logic block or a value obtained by multiplying the output of the complementation logic block by a predetermined gain obtained based on a baud rate, which indicates a speed of transmitting the bits-per-symbol information.

According to another aspect of the present invention, there is provided a constellation mapping method. The constellation mapping method involves receiving constellation point data, bits-per-symbol information, and valid symbol information indicating whether or not the bits-per-symbol information is valid, generating address information of a memory, in which constellation values corresponding to the constellation point data are stored, outputting an output of the memory or a result of complementing the output of the memory by generating real numbers and imaginary numbers in one of four quadrants of a constellation based on the address information of the memory, and selectively outputting the value output in the previous step or a value obtained by multiplying the output value by a predetermined gain.

According to still another aspect of the present invention, there is provided a computer-readable recording medium, on which the constellation mapping method is written in computer-readable program codes which can be processed in a computer.

BRIEF DESCRIPTION OF THE DRAWINGS

The above features and advantages of the present invention will become more apparent by describing in detail exemplary embodiments thereof with reference to the attached drawings in which:

FIGS. 4A through 4G are diagrams constellation maps processed by the present invention;

FIG. 7 is a table showing bit-per-symbol values and their corresponding valid input data;

FIG. 8 is a diagram illustrating the structure of a memory used in a constellation mapping apparatus according to a preferred embodiment of the present invention;

FIG. 9 is a table showing input data and the results of shifting the input data;

FIGS. 10A through 10D are diagrams showing truth tables and logic expressions for complemented and non-complemented selection signals;

DETAILED DESCRIPTION OF THE INVENTION

Hereinafter, the present invention will be described more fully with reference to the accompanying drawings.

Before explaining features of the present invention, constellations of different kinds and constellation values, which are processed by the present invention, will be described in the following paragraphs with reference to FIGS. 4A through 4G. As shown in FIGS. 4A through 4G, in the present invention, 7 constellations ranging from a 4-QAM constellation to a 256-QAM constellation are supposed to be processed by the present invention, and constellation point values may be set up arbitrarily. However, in the present invention, the constellation point values are set up to be decimal numbers corresponding to binary input values for the convenience of explanation.

Figure 1:
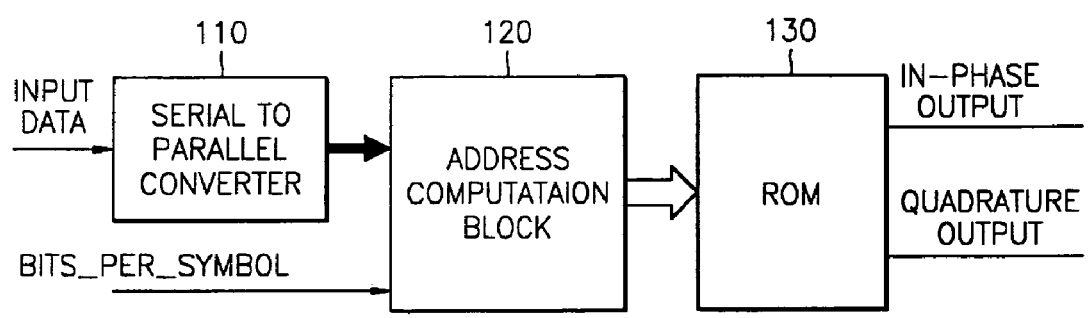
FIG. 1 is a block diagram of a conventional constellation mapping apparatus.
Figure 2:
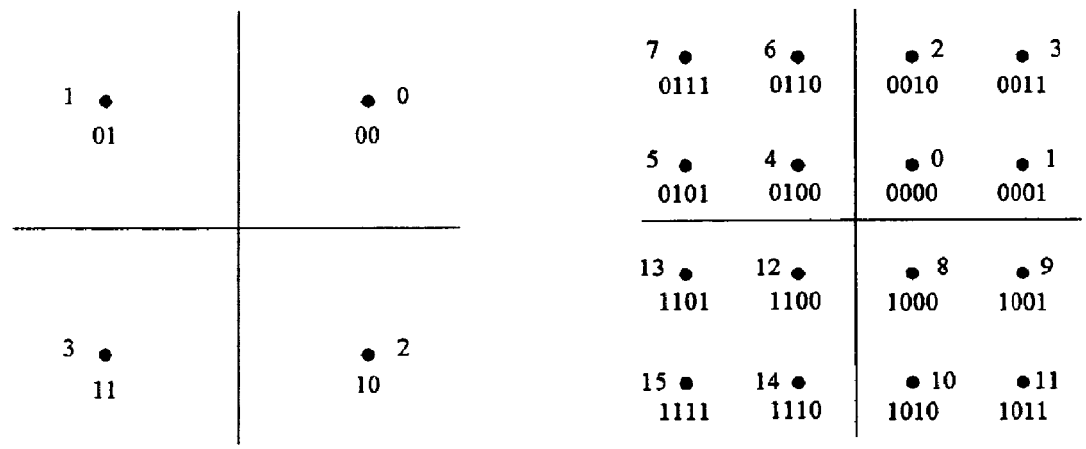
FIG. 2 is a diagram illustrating a 4-QAM constellation and a 16-QAM constellation.
Figure 3:
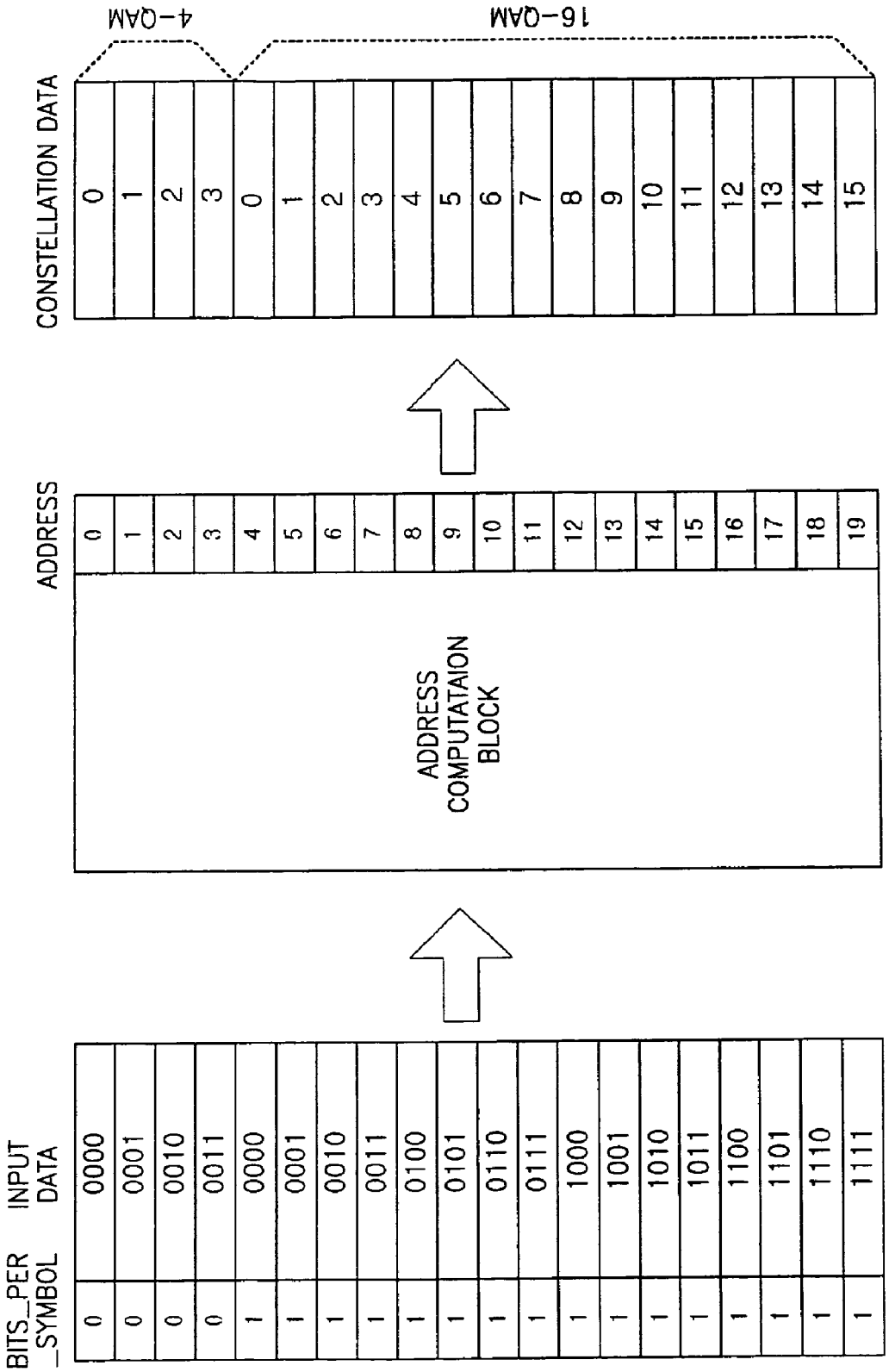
FIG. 3 is a diagram illustrating the structure of a memory for performing constellation mapping.
Figure 4A:
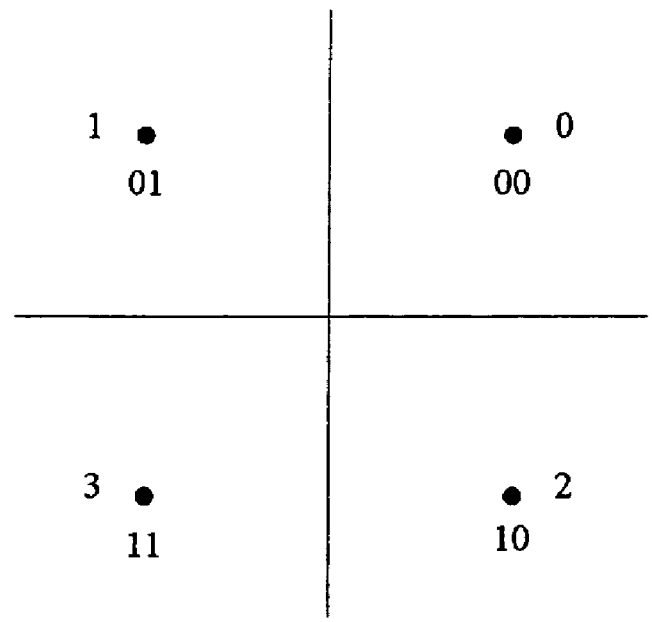
Figure 4B:
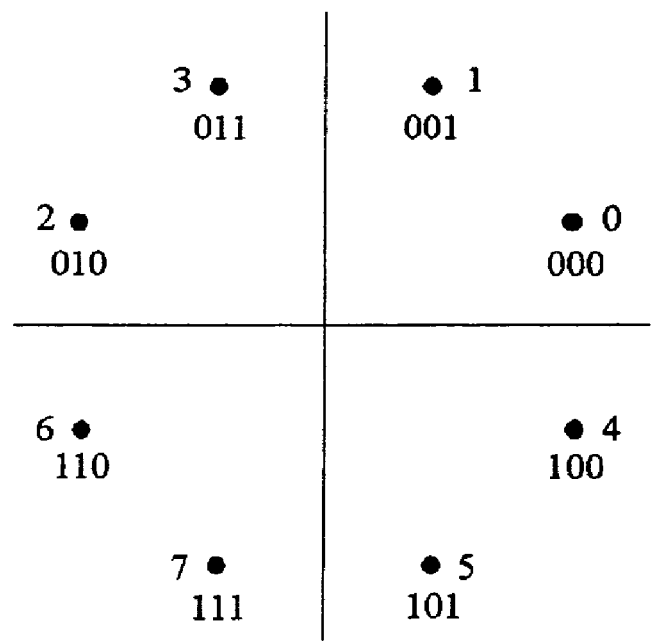
Figure 5:
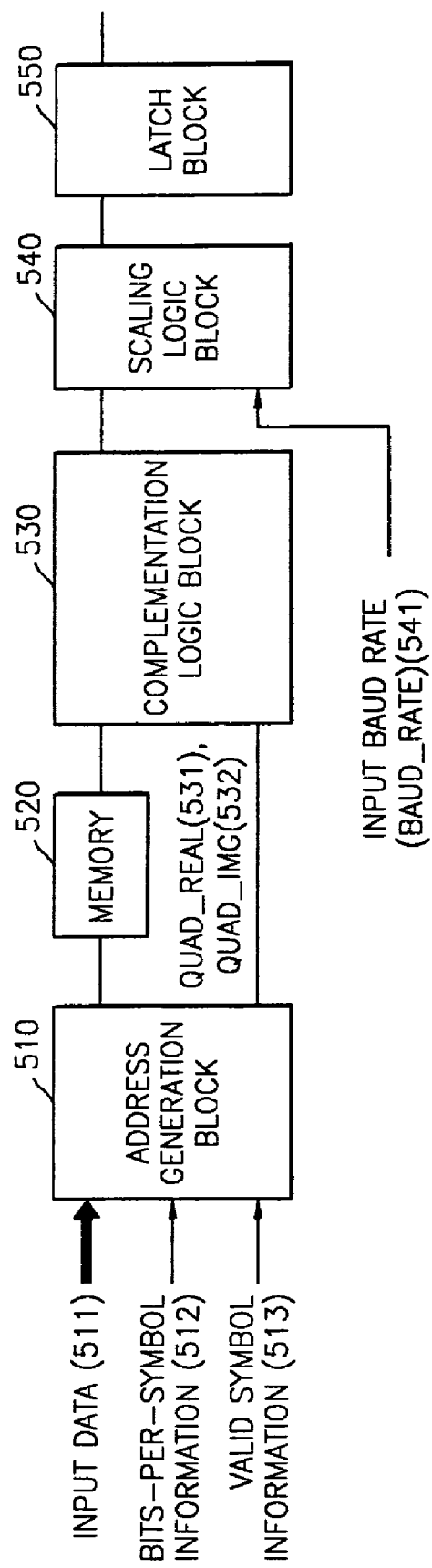
FIG. 5 is a block diagram of a constellation mapping apparatus according to a preferred embodiment of the present invention.

FIG. 5 is a block diagram of a constellation mapping apparatus according to a preferred embodiment of the present invention. The constellation mapping apparatus includes an address generation block 510, a memory 520, an complement logic block 530, a scaling block 540, and a latch block 550.

The address generation block 510 receives constellation point data 511, bits-per-symbol information 512, and valid symbol information 513 indicating whether or not input data are valid and generates addresses for constellation points.

The memory 520 stores constellation values in one quadrant among the four quadrants of each constellation and may be a ROM.

The complement logic block 530 complements or does not complement data transmitted from the memory 520, for example, a ROM, depending on a quadrant information signal indicating which quadrant the constellation points stored in the memory 520, for example, a ROM, belong to.

The scaling block 540 selectively multiplies the output of the complement logic block 530 by a gain, depending on an input baud rate (BAUD_RATE) 541, and outputs the result of the multiplication.

The latch block 550 retimes the output of the scaling block 540 for a following block connected thereto.

Figure 6:
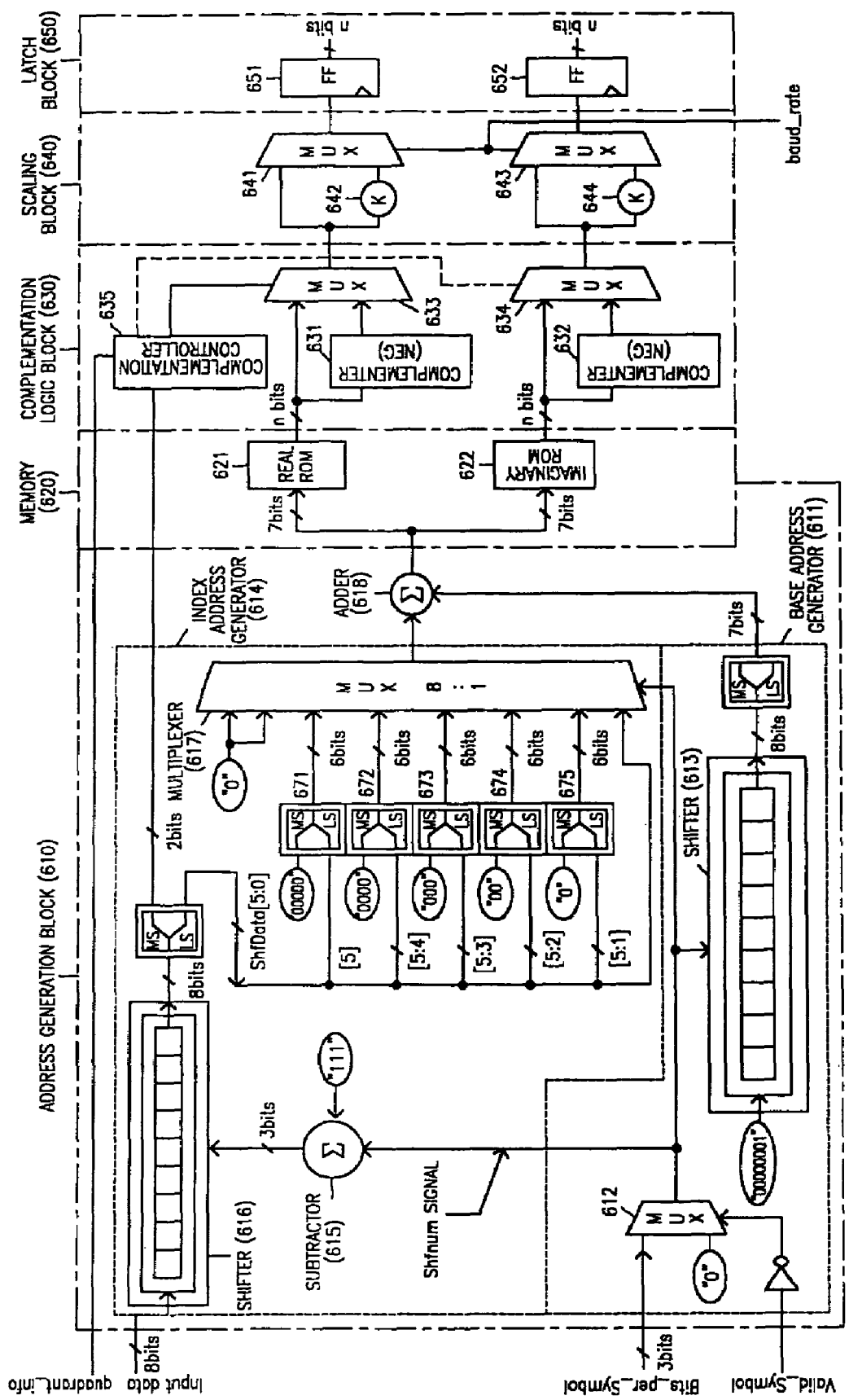
FIG. 6 is a detailed block diagram of a constellation mapping apparatus according to a preferred embodiment of the present invention.

FIG. 6 is a detailed block diagram of a constellation mapping apparatus according to a preferred embodiment of the present invention. Referring to FIG. 6, an address generation block 610 generates addresses by following an indexed addressing method performed in a general microcontroller. According to the indexed addressing method, a valid address is generated by adding a base address to an index address. Accordingly, the address generation block 610 includes a base address generator 611, which generates a base address, an index address generator 614, which generates an index address, and an adder 618, which adds the base address to the index address. For example, if a base address is 3 and an index address is 5, a valid address is 8 (3+5=8).

The base address generator 611 includes a multiplexer 612 and a shifter 613.

The multiplexer 612 receives bits-per-symbol information and valid symbol information and selects the value of the bits-per-symbol information or 0 depending on the value of the valid symbol information.

The shifter 613 shifts '00000001' by as much as the output of the multiplexer 612.

The index address generator 614 includes a subtractor 615, a shifter 616, and a multiplexer 617.

The subtractor 615 subtracts a binary value '111' from the output of the multiplexer 612 in the base address generator 611.

The shifter 616 shifts 8-bit data input thereinto by as much as the output of the subtractor 615.

The multiplexer 617 selects lower six bits ranging from a $0^{th}$ bit to a $5^{th}$ bit of the output bits of the shifter 616, receives a signal 671 consisting of a most significant bit, for example, the fifth bit, among the selected 6 bits, and a binary value '00000', a signal 672 consisting of the fifth and fourth bits of the output of the shifter 616 and a binary value '0000', a signal 673 consisting of the fifth through third bits of the output of the shifter 616 and a binary value '000', a signal 673 consisting of the fifth through second bits of the output of the shifter 616 and a binary value '00', and a signal 675 consisting of the fifth through first bits of the output of the shifter 616 and a binary value '0' via input ports, and receives the output of the multiplexer 612 in the base address generator 611 via a selection port.

The memory 620 stores constellation values in a first quadrant of each constellation and may be a ROM. The ROM is comprised of a real ROM 621 for storing real components and an imaginary ROM 622 for storing imaginary components.

The complement logic block 630 receives an in-phase output and a quadrature-phase output of the memory 620. The complement logic block 630 includes complementers 631 and 632, a complementation controller 635, and multiplexers 633 and 634.

The complementers 631 and 632 receive a signal quadrant_info indicating which quadrant the constellation points stored in the memory 620 belong to and complement input values of in-phase components and quadrature-phase components.

The complementation controller 635 receives the signal quadrant_info and upper two bits quad_real and quad_imag of the output of the shifter 616 and generates a control signal used to complement or not complement the output of the memory 620 depending on which quadrant the constellation points stored in the memory 620 belong to.

The multiplexers 633 and 634 receive the output of the complementation controller 635 via a selection port.

The scaling block 640 includes a multiplexer 641 for scaling in-phase signals and a multiplexer 642 for scaling quadrature-phase signals. The multiplexer 641 receives the seventh bit of the output of the shifter 616 in the index address generator 614 via a selection port. The multiplexer 641 receives the in-phase output of the complement logic block 630 and the result of selectively multiplying the in-phase output of the complement logic block 630 by a gain (K) depending on a baud rate.

The multiplexer 643 is the same as the multiplexer 641 except that it has the eighth bit of the output of the shifter 616 in the index address generator 614 via a selection port.

The latch block 650 performs retiming on the output of the scaling block 640 for a following block connected thereto. The latch block 650 includes two flip-flops (FF) 651 and 652 and receives the outputs of the multiplexers 641 and 642.

The constellation mapping apparatus according to the present invention receives an 8-bit input data signal, 3-bit bits-per-symbol information indicating the number of bits per symbol to be mapped, valid symbol information indicating whether or not data currently being input are valid, and an input baud rate indicating a symbol or baud rate of the constellation mapping apparatus, and outputs signals ConsMap_I and ConsMap_Q corresponding to the in-phase and quadrature-phase components, respectively, of each symbol.

The 8-bit input data enables the constellation mapping apparatus according to the present invention to process constellations of up to a 256-QAM constellation. The number of bits constituting input data may vary depending on the value of bits-per-symbol information. In other words, a QPSK constellation (a 4-QAM constellation) has a bits-per-symbol information value of '001', and only the lower two bits of input data are valid data. Since only the $0^{th}$ and $1^{st}$ bits of the input data are valid, the other bits of the input data are invalid. In the case of an 8 PSK constellation (an 8-QAM constellation), bits-per-symbol information has a value of '010', and $0^{th}$, $1^{st}$, and $2^{nd}$ bits of input data are valid. Likewise, in the case of a 256 QAM constellation, bits-per-symbol information has a value of '111', and $0^{th}$ through $7^{th}$ bits of input data are valid.

FIG. 7 is a table showing bit-per-symbol values and their corresponding valid data. As shown in FIG. 7, the number of valid bits among 8 bits constituting input data varies depending on a bits-per-symbol value, and upper two bits among the valid bits of the 8-bit input data can be used to figure out which quadrant predetermined constellation points belong to, among quadrants shown in FIGS. 4A through 4G. In other words, upper two bits in a series of bits representing constellation points are the same if the constellation points belong to the same quadrant. For example, upper two bits of constellation points belonging to a first quadrant, a second quadrant, a third quadrant, or a fourth quadrant are '00', '01', '11', or '10', respectively.

Accordingly, the upper two bits of input data can be used to indicate which quadrant each constellation point belongs to. Therefore, it is possible to process all the constellation points by storing only the constellation points belonging to one of the four quadrants in a memory rather than storing all the constellation points in the memory and using the input signals quad_real and quad_imag generated by an address generation block.

For example, in the case of a constellation point '0110' in the 16 QAM constellation map of FIG. 4C, upper two bits '01' of '0110' indicates that the corresponding constellation point belongs to the second quadrant and is away from an imaginary number axis by the same distance as a constellation point '0010' in a first quadrant. The constellation point '0110' has the same magnitude as the constellation point '0010' but a different sign.

If constellation points in the first quadrant are stored in a memory, it is possible to obtain other constellation points as well not belonging to the first quadrant by using the stored constellation points. Specifically, constellation points in the second quadrant are obtained by completing the constellation points in the first quadrant with respect to a real number axis, constellation points in the third quadrant are obtained by completing the constellation points in the first quadrant with respect to the real number axis and the imaginary number axis, and constellation points in the fourth quadrant are obtained by completing the constellation points in the first quadrant with respect to the imaginary number axis. Likewise, in a case where the constellation points in the second, third, or fourth quadrant are stored in the memory, it is possible to obtain other constellation points belonging to different quadrants from the one where the constellation points stored in the memory belong. Accordingly, it is possible to map symbol values for constellation points by only storing constellation points belonging to one of the four quadrants and then identifying which quadrant the stored constellation points belong to.

Obviously, it is possible to obtain symbol values corresponding to constellation points by only storing symbol values corresponding to the constellation points in the first quadrant and completing the symbol values of the stored constellation points with respect to one of the real number axis and the imaginary number axis or both.

FIG. 8 is a diagram illustrating the structure of a memory used in a constellation mapping apparatus according to a preferred embodiment of the present invention. A constellation mapping method will be described in the following paragraphs with reference to FIG. 8. Constellation points in the first quadrant of each of the constellations shown in FIGS. 4A through 4G are stored in a memory, which is shown in FIG. 8. In the real ROM 621 (of FIG. 6) where in-phase components are stored, a zero symbol, which makes an output signal of a constellation mapping apparatus to be zero, is stored at an address 0, a real number of a constellation point (a $0^{th}$ constellation point in FIG. 4) in the first quadrant of a 4-QAM constellation (a QPSK constellation) are stored at an address 1, and real numbers of constellation points ($0^{th}$ and $1^{st}$ constellation points shown in FIG. 4B) are stored at addresses 2 and 3. In the same manner, real numbers of constellation points in the first quarter of a 256 QAM constellation are stored at addresses 65 through 127.

The imaginary ROM 622 (of FIG. 6) where quadrature-phase components are stored is the same as the real ROM 621 except that it stores imaginary numbers rather than real numbers.

A method of generating a base address using the address generation block 610 will be described in the following paragraphs. As described above, it is possible to figure out which constellation data currently being input correspond to based on bits-per-symbol information. Accordingly, it is also possible to obtain a base address of the corresponding constellation based on the bits-per-symbol information.

Base address values of each constellation of a memory are 2, 5, 8, . . . , 65, and a start address indicated by a bits-per-symbol value must be generated. If the data currently being input are not valid symbols, the multiplexer 612 of the base address generator 611 generates '0'. On the other hand, if the data currently being input are valid symbols, the multiplexer 612 outputs the bits-per-symbol value. In other words, if valid symbol information valid_symbol has a value of 0, the multiplexer 612 outputs '0', and accordingly, the shifter 613, which shifts '00000001' by as much as the output of the multiplexer 612, and a selector, which selects upper seven bits of the shifted value, make the base address zero.

If the valid symbol information valid_symbol has a value of 1, '00000001' is shifted by as much as the bits-per-symbol value. When the bits-per-symbol value is '010', which indicates that the corresponding constellation is an 8-QAM constellation, '00000001' is shifted to the left two times so that '00000100' is obtained. Thereafter, upper seven bits of '00000100', i.e., '0000010', are selected, and accordingly, the base address is 2.

The base address of a memory is generated in the aforementioned manner, and then an index address for mapping constellation points of a constellation selected based on the bits-per-symbol value is generated using the input data. Referring to FIG. 7, the number of valid bits among 8 bits constituting input data varies depending on a bits-per-symbol value, and upper two bits among the valid bits of the 8-bit input data can be used to figure out which quadrant predetermined constellation points belong to, among quadrants shown in FIGS. 4A through 4G.

In other words, upper two bits in a series of bits representing constellation points are the same if the constellation points belong to the same quadrant. For example, upper two bits of constellation points belonging to a first quadrant, a second quadrant, a third quadrant, or a fourth quadrant are '00', '01', '11', or '10', respectively.

It is necessary to divide bits constituting input data into two parts, i.e., upper two bits indicating which quadrant the input data correspond to and other bits to be mapped as constellation points. The location of upper two bits of valid input data may vary depending on the constellation, and thus upper two bits of valid input data corresponding to different constellations must be obtained by using different methods. In order to prevent such complexity in obtaining upper two bits from input data corresponding to different constellations, the input data are shifted by as much as the output of the subtractor 715 so that the upper two bits are located at the same position throughout the different constellations.

FIG. 9 is a table showing input data and the results of shifting the input data. Referring to FIG. 9, upper two bits of input data indicate a quadrant where the input data belong to irrespective of a constellation corresponding to the input data. The other six bits of the input data ranging from a $0^{th}$ bit to a $5^{th}$ bit are used to generate an index address so that the index address can correspond to constellation points in the quadrant where the input data belong to. Thereafter, as many bits as the number of bits constituting the bits-per-symbol information are selected from the six bits so that a quadrant where the input data belong to can be identified based on the value of the bits-per-symbol information.

In other words, in the case of an 8-QAM constellation, there is only one meaningful bit, i.e., a fifth bit, among six bits used to generate an index address. In the case of a 16-QAM constellation, there are two meaningful bits, i.e., fifth and fourth bits, among six bits used to generate an index address. In the case of a 32-QAM constellation, there are three meaningful bits, i.e., fifth, fourth, and third bits, among six bits used to generate an index address. In the case of a 64-QAM constellation, there are four meaningful bits, i.e., fifth, fourth, third, and second bits, among six bits used to generate an index address. In the case of a 126-QAM constellation, there are five meaningful bits, i.e., fifth, fourth, third, second, and first bits, among six bits used to generate an index address. In the case of a 256-QAM constellation, there are six meaningful bits, i.e., fifth, fourth, third, second, first, and zeroth bits, among six bits used to generate an index address. However, in the case of a 4-QAM constellation, there is no meaningful bit among six bits used to generate an index address because there are only two valid bits and the two valid bits are the bits indicating a quadrant where input data belong to. The bit values selected in the aforementioned manner are transmitted to second, third, fourth, fifth, sixth, and seventh input ports of the multiplexer 617. In the case of a 4-QAM constellation or invalid data (valid_symbol=0), a value of 0 is transmitted to zeroth and first input ports of the multiplexer 617.

The index address generated in the aforementioned manner is added to the base address so that an address of a memory where symbols corresponding to constellation points are stored can be generated.

For example, let us assume that a bits-per-symbol value is comprised of 3 bits, i.e., '011', valid symbol information has a value of 1, and input data are '00001101'. The bits-per-symbol value indicates that the input data belong to a 16-QAM constellation. A base address '0000100' is obtained by shifting '00000001' to the left three times and selecting upper seven bits of '00001000' and indicates a fourth address of a memory.

To generate an index address, the input data '00001101' are shifted to the left by as many times as 7−Shfnum (which is 4 because Shfnum=3) so that '11010000' is obtained. Upper two bits '11' of '11010000' represent a third quadrant among four quadrants, and meaningful bits among the other six bits '010000' are fifth and fourth bits '01'. The fifth and fourth bits '01' are coupled with '0000' so that '00001' is obtained. The value '00001' is output through a selection port of the multiplexer 617 and then is input into the adder 618. Accordingly, the final output of the address generation block 610 is a fifth address (4+1=5), which is obtained by adding the base address '0000100' and the index address '000001'.

The address of a memory, which has been generated in the aforementioned manner, generates real numbers and imaginary numbers in one of the four quadrants of a constellation. The output of the memory is input into the complement logic block 630 so that values in the corresponding quadrant can be generated.

The complement logic block 630 can figure out which quadrant constellation points stored in a memory belong to, using the signal quadrant_info. For example, if quadrant_info has a binary value of '00', '01', '11', or '10', the constellation points stored in the memory belong to the first quadrant, the second quadrant, the third quadrant, or the fourth quadrant, respectively. The complementation logic block 630 processes quad_real and quad_imag along with quadrant_info and then output the processed information to the selection port of the multiplexer 617, which selects either an output of a memory or a complemented output of the memory.

Whether to select a complemented or non-complemented output of the memory depends on a quadrant where the constellation points stored in the memory belong to. In other words, if input data include points in the third quadrant and constellation points in the second quadrant are stored in the memory, a real number axis is comprised of non-complemented values of real numbers of the constellation points stored in the memory, and an imaginary number axis is comprised of complemented values of imaginary numbers of the constellation points stored in the memory. However, if constellation points in the fourth quadrant are stored in the memory, the real number axis must be comprised of complemented values of real numbers of the constellation points stored in the memory, and the imaginary number axis must be comprised of non-complemented values of imaginary numbers of the constellation points stored in the memory.

The complementation controller 635 generates a complemented or non-complemented selection signal depending on a quadrant where input data are to be mapped as constellation points and a quadrant where constellation points stored in the memory belong to. The input signal quadrant_info indicates which quadrant the constellation points stored in the memory belong to, and the values quad_real and quad_imag indicate which quadrant the input data are to be mapped. Accordingly, the complementation controller 635 generates a complemented or non-complemented selection signal based on quadrant_info, quad_real, and quad_imag.

FIGS. 10A through 10D are diagrams showing truth tables and logic expressions regarding generation of complemented and non-complemented selection signals.

FIG. 10A shows a truth table and logic expressions when constellation points in the first quadrant are stored in a memory (quadrant_info='00'). FIG. 10B shows a truth table and logic expressions when constellation points in the second quadrant are stored in the memory (quadrant_info='01'). FIG. 10C shows a truth table and logic expressions when constellation points in the third quadrant are stored in the memory (quadrant_info='11'). FIG. 10D shows a truth table and logic expressions when constellation points in the fourth quadrant are stored in the memory (quadrant_info='10'). In FIGS. 10A through 10D, q1 and q0 represent quad_imag and quad_real, respectively, and S1 and S2 represent a selection port of a multiplexer corresponding to an imaginary number axis and a selection port of a multiplexer corresponding to a real number axis, respectively.

Referring to FIG. 10B, the input signals quad_real (qr0) and quad_imag (qr1) indicate a quadrant where data having been through the address generation block 610 belong. Here, let us assume that '00', '01', '11', and '10' represent a first quadrant, a second quadrant, a third quadrant, and a fourth quadrant, respectively. FIG. 10B shows a truth table and logic expressions in a case where the constellation points in the second quadrant are stored in the memory. When (qr0, qi1)= (0, 0), in other words, when the input data are the constellation points in the first quadrant, the complementation logic block 630 is required to select a signal, which complements real number signals (I) output from the memory but allows imaginary number signals (Q) to be output from the memory without being complemented.

Accordingly, when (qr0, qi1)=(0, 0), (S1, S0)=(+, −), which may be applied to the third and fourth quadrants as well. Here, '+' indicates that the selection ports S0 and S1 select non-complemented signals, and '−' indicates that the selection ports S0 and S1 select complemented signals.

Figure 11:
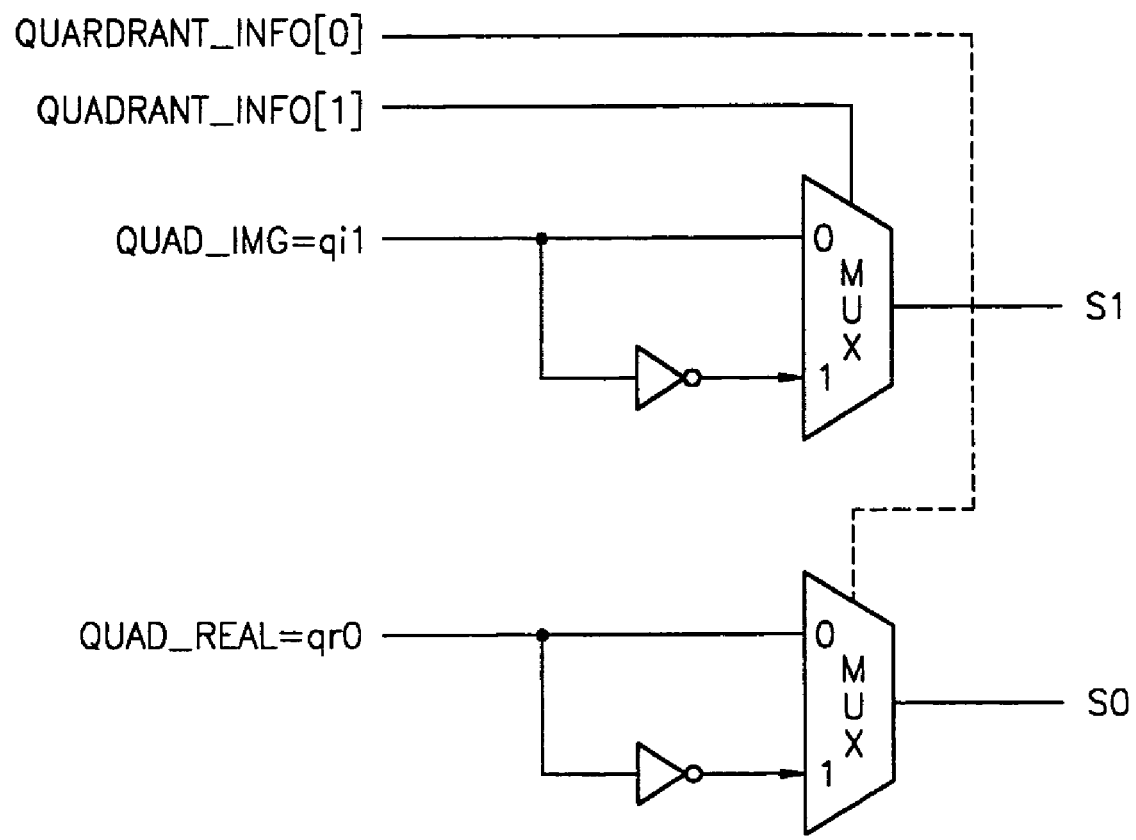
FIG. 11 is a diagram illustrating an complement logic controller.

FIG. 11 is a diagram of the complementation controller 635. Referring to FIG. 11, the complementation controller 635 generates a signal used for selecting non-complemented or complemented signals of the real number output signals (I) and non-complemented or complemented signals of the imaginary number output signals (Q) of a memory.

Figure 12:
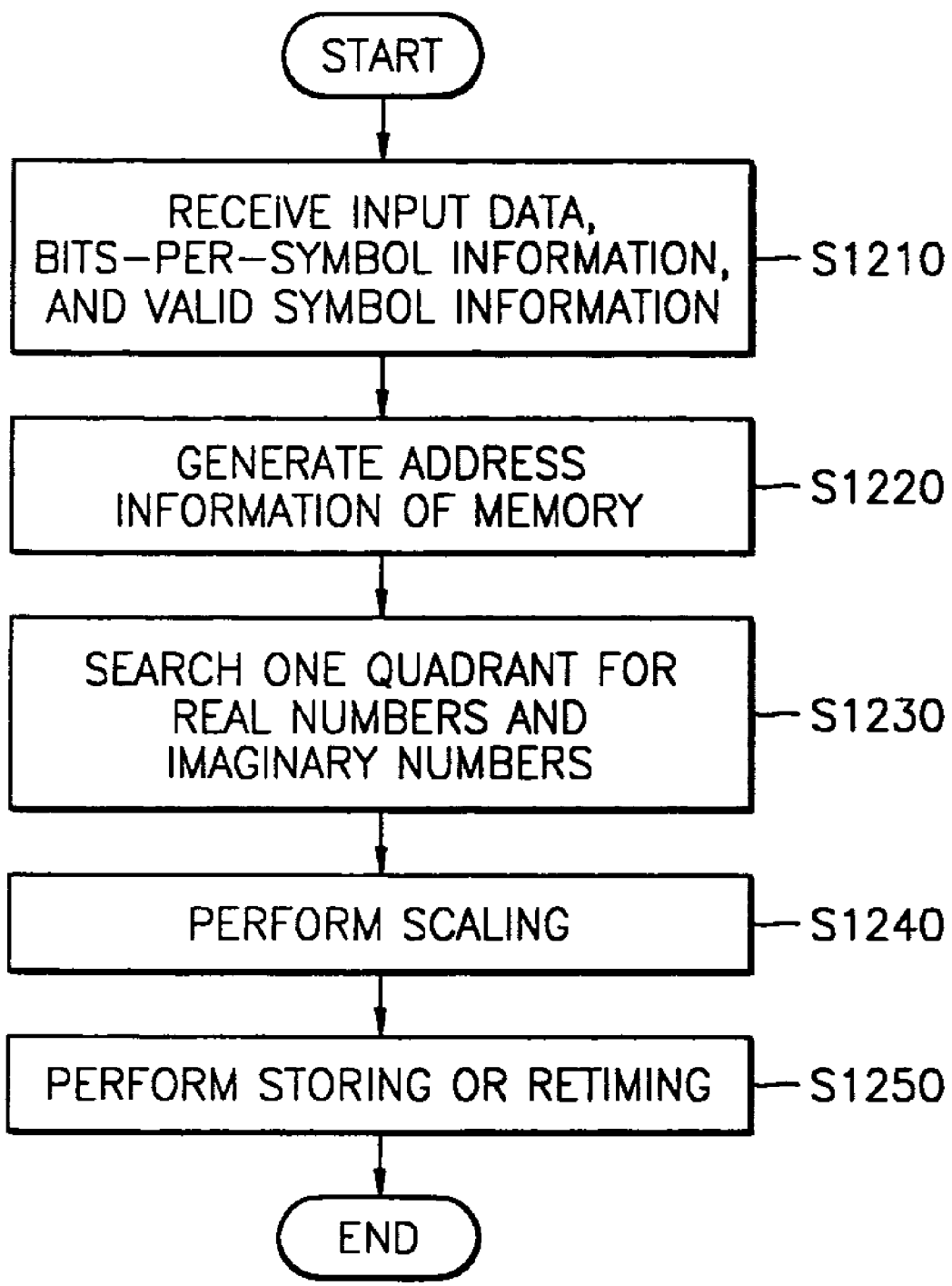
FIG. 12 is a flowchart of a constellation mapping method according to a preferred embodiment of the present invention.

FIG. 12 is a flowchart of a constellation mapping method according to a preferred embodiment of the present invention. Referring to FIG. 12, the address generation block 510 receives a bits-per-symbol value, valid symbol information, and input data in step S1210, and then generates address information of a memory using the input data in the aforementioned manner in step S1220.

The address information of the memory is used to generate a real number and an imaginary number in one of the four quadrant of a constellation in step S1230. In other words, the output of the memory is input into the complementation logic block 530 so that values in the corresponding quadrant can be generated. The complementation logic block 530 can figure out which quadrant constellation points stored in the memory belong to based on the aforementioned quadrant information quadrant_info. The complementation controller 635 processes quad_real and quad_imag along with quad_info so as to allow a non-complemented or complemented signal of the output of the memory to be selectively output.

A value obtained by multiplying the output of the complementation logic block 530 by a predetermined gain or the output of the complementation logic block 530 is selectively output in step S1240. In other words, an in-phase output signal and the result of multiplying the in-phase output signal by a gain (K) obtained based on a baud rate are received, which is directly applied to a quadrature-phase output signal. In the case of the in-phase output signal, a seventh bit of an output signal of a shifter in an index address generator is input into a multiplexer via a selection port. However, in the case of the quadrature-phase output signal, an eighth bit of the output signal of the shifter in the index address generator is input into the multiplexer via the selection port.

Finally, in step S1250, the latch block 550 stores or performs retiming on the signal output in step S1240 for a following block connected thereto.

As described above, according to the present invention, it is possible to reduce a storage capacity of a memory to one fourth by only storing constellation points in one quadrant of the four quadrants of each constellation map rather than storing all the constellation points on each of the constellation maps.

In addition, according to the present invention, even when there are many constellations to be processed, it is possible to reduce the size of an address generation block, as compared with the prior art using a look-up table or a ROM, by dividing the address generation block into two parts, i.e., a unit for generating a start address for each of the constellation maps and a unit for generating an address for each constellation point in a constellation map indicated by bits-per-symbol information by processing input data.

It is also possible to simplify the hardware structure of a modulator and the size of a modem chip by reducing the size of a constellation processor used for modulation in high data transmission or home data transmission, like home PNA, which is required to process various constellation maps.

The present invention can be realized as computer-readable codes written on a computer-readable recording medium. Here, the computer-readable recording medium includes any kind of recording medium which can be read by a computer system. For example, the computer-readable recording medium may include a ROM, a RAM, a CD-ROM, a magnetic tape, a floppy disk, an optical data storage, a carrier wave (transmission through the Internet), and the like. The computer-readable recording medium can be decentralized to computer systems connected over a network, and a computer can read the recording medium in a decentralized way.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A constellation mapping method comprising:
   receiving constellation point data, bits-per-symbol information, and valid symbol information indicating whether or not the bits-per-symbol information is valid;
   generating address information of a memory, in which constellation values corresponding to the constellation point data are stored;
   outputting an output of the memory or a result of complementing the output of the memory by generating real numbers and imaginary numbers in one of four quadrants of a constellation based on the address information of the memory; and
   selectively outputting the value output in the previous step or a value obtained by multiplying the output value by a predetermined gain.

2. The constellation mapping method of claim 1 further comprising storing the selectively output value or performing retiming on the selectively output value for a following block.

3. The constellation mapping method of claim 1, wherein generating the address information of the memory, comprises;
   generating a base address;
   generating an index address; and
   adding the base address and the index address.

4. The constellation mapping method of claim 3, wherein generating the base address, comprises:
   receiving bits-per-symbol information and valid symbol information and selectively outputting a value of the bits-per-symbol information or 0 depending on a value of the valid symbol information; and
   shifting a binary number '00000001' by as much as the selectively output value.

5. The constellation mapping method of claim 3, wherein generating the index address, comprises;
   subtracting a predetermined value from the value generated in generating the base address;
   shifting the input data by as much as the result of the subtraction; and
   receiving data obtained by selecting lower six bits of the result of the shifting and coupling a most significant bit among the selected lower six bits with a binary number '00000', data obtained by coupling fifth and fourth bits among the selected lower six bits with a binary number '0000', data obtained by coupling the fifth bit through a third bit among the selected lower six bits with a binary number '000', data obtained by coupling the fifth bit through a second bit among the selected lower six bits with a binary number '00', data obtained by coupling the fifth bit through a firth bit among the selected lower six bits with a binary number '0', a binary number '000000', and receiving the value output in generating the base address via a selection port.

6. A computer-readable recording medium, on which the method of claim 1 is written in computer-readable program codes which can be processed in a computer.

* * * * *